United States Patent
Daijavad et al.

(10) Patent No.: US 10,423,914 B2
(45) Date of Patent: Sep. 24, 2019

(54) INDUSTRIAL SETUP COMPOSITION

(71) Applicant: INTERNATIONAL BUSINESS MACHINES CORPORATION, Armonk, NY (US)

(72) Inventors: Shahrokh Daijavad, Morgan Hill, CA (US); Nirmit V. Desai, Yorktown Heights, NY (US); Martin G. Kienzle, Ossining, NY (US); Theodoros Salonidis, Boston, MA (US); Rahul Urgaonkar, Shoreline, WA (US); Dinesh C. Verma, New Castle, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 219 days.

(21) Appl. No.: 15/205,291

(22) Filed: Jul. 8, 2016

(65) Prior Publication Data
US 2018/0013633 A1    Jan. 11, 2018

(51) Int. Cl.
*G06Q 10/06* (2012.01)
*H04L 12/24* (2006.01)

(52) U.S. Cl.
CPC ..... *G06Q 10/0637* (2013.01); *H04L 41/5054* (2013.01); *H04L 41/5003* (2013.01); *H04L 41/5096* (2013.01)

(58) Field of Classification Search
CPC ...... H04L 41/14; H04L 67/12; G06Q 10/0637
See application file for complete search history.

(56) References Cited

U.S. PATENT DOCUMENTS

| 8,121,874 B1* | 2/2012 | Guheen ............... G06Q 10/063 705/28 |
| 8,769,653 B2* | 7/2014 | Cao ....................... H04L 9/3226 726/9 |
| 8,875,230 B1 | 10/2014 | Weiner et al. |

(Continued)

OTHER PUBLICATIONS

Sandhu et al., "Role-Based Access Control: A Multi-Dimensional View," Proceedings of 10th Annual Computer Security Applications Conference. DOI: 10.1109/CSAC.1994.367293, 1994, pp. 1-9.

*Primary Examiner* — Brian J. Gillis
*Assistant Examiner* — Chhian (Amy) Ling
(74) *Attorney, Agent, or Firm* — Cantor Colburn LLP

(57) ABSTRACT

Technical solutions are described for selecting components from multiple vendors for a system. An example computer-implemented method includes receiving, by a processor, an environment map that identifies a first component placeholder of the system. The computer-implemented method further includes identifying, by the processor, that the first component placeholder interfaces with a second component placeholder of the system. The computer-implemented method further includes determining, by the processor, a role assigned to the first component placeholder, where the role indicates a type of data that a first component at the first component placeholder communicates with a second component at the second component placeholder. The computer-implemented method further includes determining, by the processor, a list of components for selecting the first component, where each component from the list of components matches the role assigned to the first component placeholder.

12 Claims, 7 Drawing Sheets

(56) References Cited

U.S. PATENT DOCUMENTS

| | | |
|---|---|---|
| 9,137,263 B2 | 9/2015 | Chari et al. |
| 2008/0244540 A1* | 10/2008 | Feblowitz ................. G06F 8/10 |
| | | 717/143 |
| 2010/0011438 A1* | 1/2010 | Bartley ................. G06F 21/604 |
| | | 726/17 |
| 2011/0145933 A1 | 6/2011 | Gambir et al. |
| 2012/0117538 A1* | 5/2012 | Buckley .................... G06F 8/70 |
| | | 717/120 |
| 2013/0191879 A1 | 7/2013 | Jaber et al. |
| 2014/0082613 A1* | 3/2014 | Kundu ..................... G06F 8/63 |
| | | 718/1 |
| 2014/0196103 A1* | 7/2014 | Chari ..................... H04L 63/20 |
| | | 726/1 |
| 2015/0089575 A1 | 3/2015 | Vepa et al. |
| 2015/0205602 A1* | 7/2015 | Prismon .................... G06F 8/71 |
| | | 717/121 |
| 2016/0087956 A1 | 3/2016 | Maheshwari et al. |

* cited by examiner

INDUSTRIAL SETUP COMPOSITION

BACKGROUND

The present application relates to setting up or composing an industrial system, and more specifically, to selecting components from among multiple vendors for use in the industrial system.

An industrial system may include multiple different component devices operating in coordination. The component devices (e.g., smart controllers) are typically embedded with processing capability, which facilitates the use of a variety of "smart" techniques, such as Internet of Things. The component devices of an industrial system typically generate data that is processed by a variety of analytics systems. Because the component devices, as well as the analytics systems, of industrial systems are often sourced from different competing manufacturers/vendors, the competing vendors often place restrictions (e.g., policy requirements) on how the components/systems they sell can be interfaced with other, potentially competing components or systems. It can be difficult for operators of industrial systems to manage the different policy requirements of different vendors, particularly when an operator desires to mix and match components/system supplied by different vendors.

SUMMARY

According to one or more embodiments, a computer-implemented method for selecting components from multiple vendors for a system includes receiving, by a processor, an environment map that identifies a first component placeholder of the system. The computer-implemented method further includes identifying, by the processor, that the first component placeholder interfaces with a second component placeholder of the system. The computer-implemented method further includes determining, by the processor, a role assigned to the first component placeholder, where the role indicates a type of data that a first component at the first component placeholder communicates with a second component at the second component placeholder. The computer-implemented method further includes determining, by the processor, a list of components for selecting the first component, where each component from the list of components matches the role assigned to the first component placeholder.

According to one or more embodiments, an apparatus for selecting components from multiple vendors for a system includes a memory; and a processor coupled with the memory. The processor receives an environment map that identifies a first component placeholder of the system. The processor further identifies that the first component placeholder interfaces with a second component placeholder of the system. The processor further determines a role assigned to the first component placeholder, where the role indicates a type of data that a first component at the first component placeholder communicates with a second component at the second component placeholder. The processor further determines a list of components for selecting the first component, where each component from the list of components matches the role assigned to the first component placeholder.

According to one or more embodiments, a computer program product for selecting components from multiple vendors for a system includes a non-transitory computer readable storage medium. The computer readable storage medium includes computer executable instructions, where the computer readable storage medium includes instructions to: receive an environment map that identifies a first component placeholder of the system. The computer readable storage medium further includes instructions to identify that the first component placeholder interfaces with a second component placeholder of the system. The computer readable storage medium further includes instructions to determine a role assigned to the first component placeholder, where the role indicates a type of data that a first component at the first component placeholder communicates with a second component at the second component placeholder. The computer readable storage medium further includes instructions to determine a list of components for selecting the first component, where each component from the list of components matches the role assigned to the first component placeholder.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Figure 1:
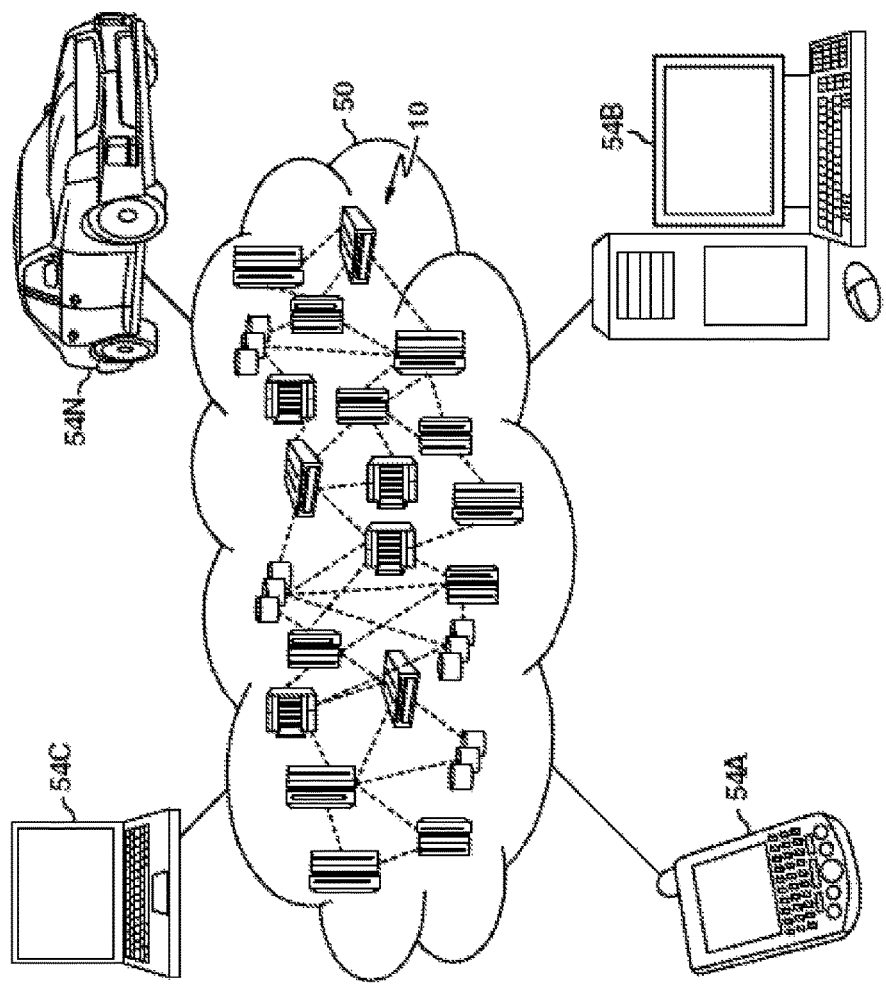
FIG. 1 illustrates a cloud-computing environment in accordance with one or more embodiments.

As previously noted herein, because the component devices, as well as the analytics systems, of industrial systems are often sourced from different competing manufacturers/vendors, the competing vendors often place restrictions (e.g., policy requirements) on how the components/systems they sell can be interfaced with other, potentially competing components or systems. For example, a component device vendor/manufacturer may require that any analytics done on data from a component it supplies only be performed by analytics systems from specific preferred vendors (suppliers, manufacturers). Further, a component device vendor may require that a component it supplies is only interfaced with specific components supplied by specific vendors. Accordingly, it can be difficult for operators of industrial systems to manage the different policy requirements of different and often competing vendors, particularly when an operator desires to mix and match components/systems sourced from different vendors.

Disclosed here are technical solutions for facilitating an operator of an industrial system to mix and match components supplied by different vendors, and yet be able to meet policy requirements of the vendors regarding sharing of proprietary data. The technical solutions described herein facilitate the industrial system operator of the industrial system to solve the technical problems described herein by facilitating the industrial system operator to describe the industrial system as a collection of different roles. For example, a role identifies other roles (inputs and outputs) which are linked to the role. A component vendor may specify acceptable roles for components that the vendor manufactures. For example, the component vendor may specify a vendor policy for each component that the component vendor manufactures and/or provides. The vendor policy may also be referred to as a component policy.

The vendor policy for a component specifies constraints and/or restrictions about one or more roles in which the component may (or may not) be used. In addition or alternatively, the vendor policy for the component may specify a list of one or more roles with which the component may (or may not) communicate. For example, the industrial system administrator assigns roles to the placeholders for the various components in a system plan of the industrial system.

The technical solutions described herein facilitate a system to setup the industrial system that includes a role-field to store a value of the role for a placeholder in the system plan for the industrial system. By assigning the role value to the role-field, the industrial administrator identifies a topology in which data from different components (and thus from respective vendors) in the industrial system is communicated and managed. The technical solutions described herein facilitates the industrial administrator to select components to use in the placeholders in order to ensure compliance with the vendor policy restrictions of the different components of the industrial system, while still allowing the industrial administrator to mix and match components from various vendors.

As will be apparent throughout the present description, an administrator is a person, company, or organization that buys/leases equipment and software from different vendors and uses the components in an industrial setting, such as an assembly line, a manufacturing plant, a packaging plant, a mining operation, an oil drilling operation, a shipping operation, a package delivery operation, a pathological laboratory, or any other such industrial/automated setting. Further, a component vendor is a company, which supplies hardware and/or software components to the industrial administrator. While the present disclosure uses an industrial setting such as a manufacturing plant as an example environment to describe the technical solutions described herein, it is understood that the technical solutions can be used in other settings such as hospitals, laboratories, transportation lines, airports, and any other environment in which components from multiple vendors are used to compose a system.

It is further understood that although this disclosure includes a detailed description on cloud-computing, implementation of the teachings recited herein are not limited to a cloud-computing environment. Rather, embodiments of the present invention are capable of being implemented in conjunction with any other type of computing environment now known or later developed.

Cloud-computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure comprising a network of interconnected nodes.

Referring now to FIG. 1, illustrative cloud-computing environment 50 is depicted. As shown, cloud-computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
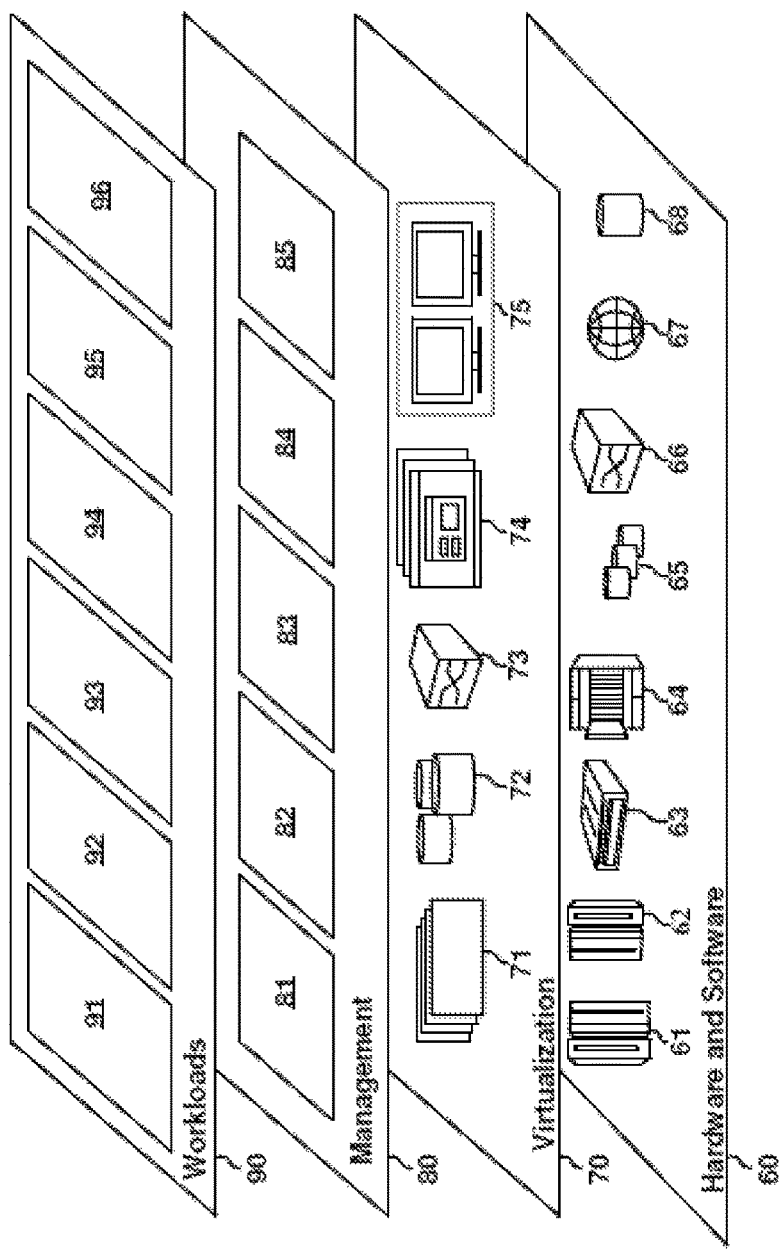
FIG. 2 illustrates a set of functional abstraction layers provided by cloud computing environment in accordance with one or more embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud-computing environment may be utilized. Examples of workloads and functions which may be provided from this layer include: mapping and navigation 91; software development and lifecycle management 92; environment map analysis/creation 93; data analytics processing 94; transaction processing 95; and facilitating an operator to compose an environment, such as an industrial floor space and the like 96.

Figure 3:
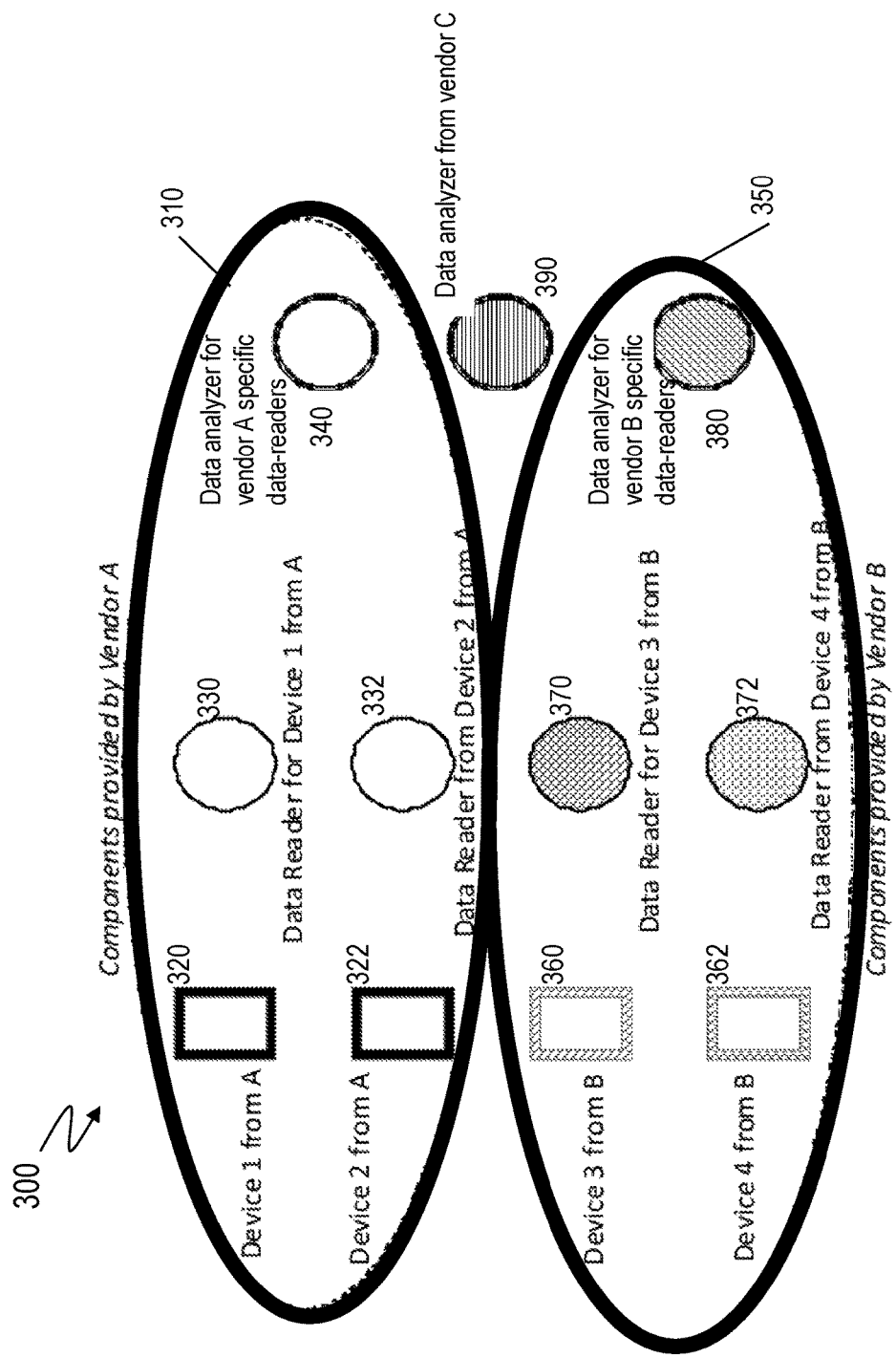
FIG. 3 illustrates an example environment being composed by an operator in accordance with one or more embodiments.

FIG. 3 illustrates an example environment of the technical solutions described herein. The exemplary environment of FIG. 3 shows an industrial setup 300 that uses data generating devices, such as sensors, industrial robots, code scanners, industrial control systems, and the like. The industrial administrator may own, rent, lease, or have other arrangements to use any of the devices. The devices in the environment may include hardware and/or software components that generate data, and that process and/or control the data generated. In one or more examples, the industrial administrator may desire to use controlling and/or processing components that are from the same vendors as the vendors of the devices that generate the data. Alternatively or in addition, the industrial administrator may desire to use the controlling and/or processing components from vendors that are different from those of the data generating devices. For simplicity, the controlling and/or processing components are referred to as control components.

FIG. 3 illustrates an example configuration in which an industrial administrator D desires to use two separate device vendors (A, B) and three control component vendors (A, B, C). Two of these vendors (A and B) provide sets of components 310 and 350, which include data generating components (referred to as devices) and components for reading data from the devices, as well as components for analyzing output from the devices. Vendor C provides only an analyzer component 390. As illustrated, vendor A provides the set 310 of devices and components, which includes devices 320 and 322 that generate data. The set 310 from vendor A further includes components 330 and 332, which respectively read data generated by the devices 320 and 322. The vendor A further provides the component 340, which analyzes the data read by the reader components 330 and 332. The analyzer component 340 may analyze data that is specifically from devices and/or components from the vendor A. The industrial setup of FIG. 3 further includes the set 320 of devices and/or components from the vendor B. The set 350 from the vendor B includes devices 360 and 362 that generate data. The set 350 from vendor B further includes components 370 and 372, which respectively read data generated by the devices 360 and 362. The vendor B further provides the component 380, which analyzes the data read by the reader components 370 and 372. The analyzer component 380 may analyze data that is specifically from devices and/or components from the vendor B.

As described earlier, a vendor of devices, such as vendor A and vendor B in the exemplary scenario, may have concerns about sharing its device data with devices from a vendor who is a competitor. As an example, the vendor A may not want device information from devices in the set 310 to be read by devices or analysis components from the vendor B, or from the vendor C. For example, the device information may reveal differentiating aspects regarding operation of the devices in the set 310 to the competing vendors B and C. However, at the same time, the industrial administrator D may prefer to have freedom of choice regarding which devices or analysis components to use for analyzing the data from the devices in the industrial setup 300, and not be locked into using analysis component from specific vendors. Further, the industrial administrator D may also prefer to mix and match the devices/components that communicate with each other, regardless of whether the device/component vendors are competitors.

The technical solutions described herein facilitate the industrial operator to compose the industrial setup 300 according to preferences of the industrial operator. To this end, the technical solutions facilitate a device to express restrictions on what can and what cannot be done with the data from the device, and enforce the restrictions. The technical solutions further facilitate vendors to specify the restrictions and the industrial operator to configure the restrictions. The technical solutions further facilitate the industrial operator to exercise flexibility in how the industrial setup is composed using components from different vendors. The technical solutions, thus, facilitate flexibility to the industrial operator along with being compliant with restrictions from the vendors.

Figure 4:
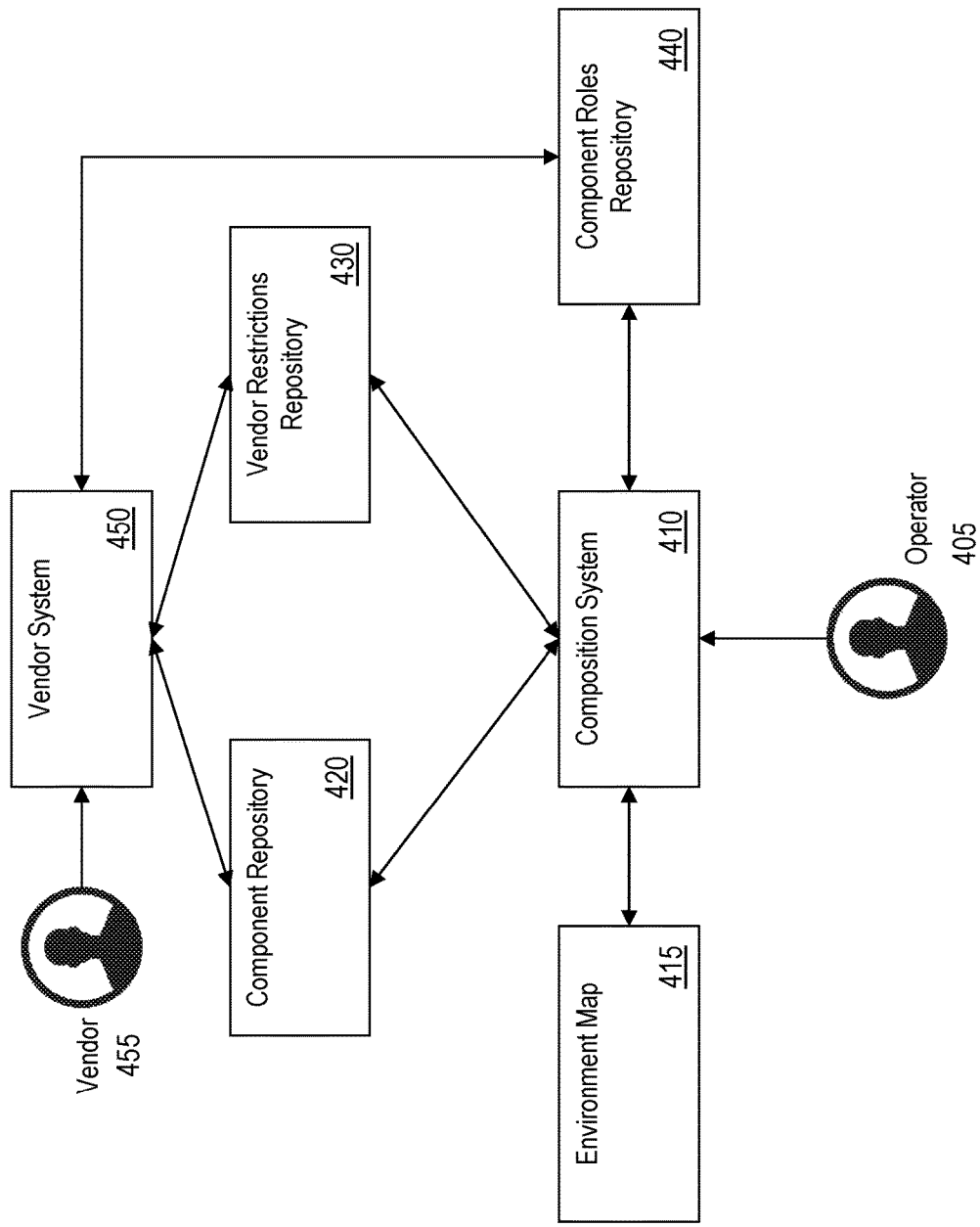
FIG. 4 illustrates an example composition system in accordance with one or more embodiments.

FIG. 4 illustrates an example composition system 410 that facilitates implementation of the technical solutions described herein. An operator 405, such as the industrial operator D, may use the composition system 410 to compose an environment, such as the industrial setup 300. The operator may setup the environment using an environment map 415. The composition system 410 may access data from a component repository 420, a vendor restrictions repository 430, and a component roles repository 440, among others. The composition system 410 may access the data in a wired or a wireless manner. The composition system 410 may be implemented in a multiple of embodiments, e.g. an embodiment may have the system running in the cloud described in FIG. 1 as SaaS, while other embodiment may be implemented on a system as described in FIG. 5.

Figure 5:
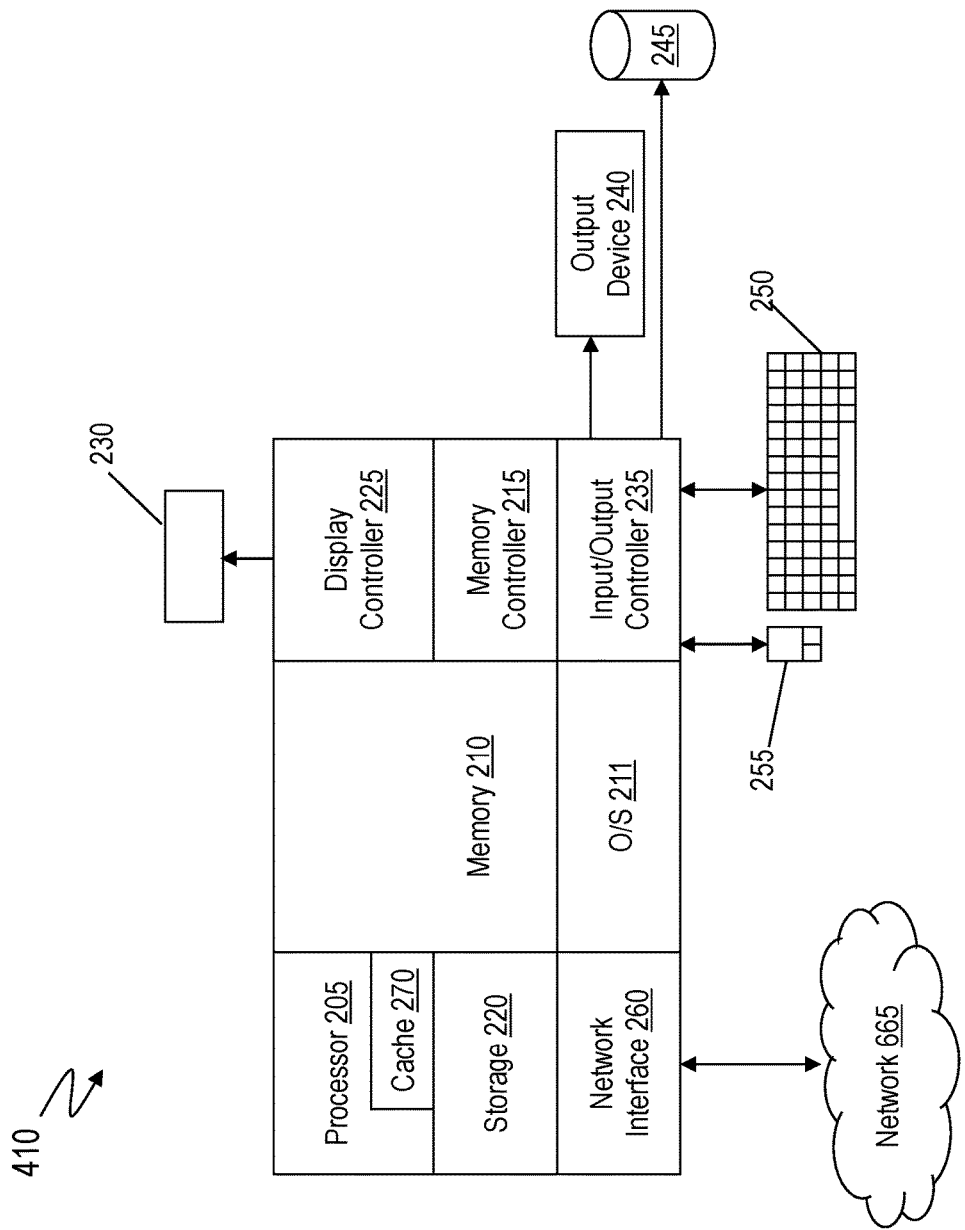
FIG. 5 illustrates example components of a composition system in accordance with one or more embodiments.

FIG. 5 illustrates example components of the composition system 410. The composition system 410 may be a communication apparatus, such as a computer. For example, the composition system 410 may be a desktop computer, a tablet computer, a laptop computer, a phone, such as a smartphone, a server computer, or any other device that communicates via a network 665. The composition system 410 includes hardware, such as electronic circuitry.

The composition system 410 includes, among other components, a processor 205, memory 210 coupled to a memory controller 215, and one or more input devices 245 and/or output devices 240, such as peripheral or control devices, which are communicatively coupled via a local I/O controller 235. These devices 240 and 245 may include, for example, battery sensors, position sensors (altimeter, accelerometer, GPS), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the composition system 410, a semiconductor based microprocessor (in the form of a microchip or chip set), a macroprocessor, or other device for executing instructions. The processor 205 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods of this disclosure.

The composition system 410 may further include a display controller 225 coupled to a user interface or display 230. In some embodiments, the display 230 may be an LCD screen. In other embodiments, the display 230 may include a plurality of LED status lights. In some embodiments, the composition system 410 may further include a network interface 260 for coupling to a network 165. The network 165 may be an IP-based network for communication between the composition system 410 and an external server, client and the like via a broadband connection. In an embodiment, the network 165 may be a satellite network. The network 165 transmits and receives data between the composition system 410 and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Referring back to FIG. 4, in one or more examples, the component repository 420, the vendor restrictions repository 430, and the component roles repository 440, may be part of the composition system 410. Alternatively, one or more of the component repository 420, the vendor restrictions repository 430, and the component roles repository 440, may be separate components. The component repository 420 may be a database system that stores information of one or more components that the operator 405 may use to setup the environment. For example, if the operator 405 is composing the industrial setup 300, the composition system 410 accesses, from the component repository 420, information about the components that the operator 405 may use in the industrial setup 300. In one or more examples, the composition system 410 accesses different component repositories based on a type of the environment. For example, the component repository 420 may include information about industrial components, typically used in an industrial setup. Alternatively or in addition, the component repository 420 may include information about laboratory components, typically used in a laboratory setup. Alternatively or in addition, the component repository 420 may include information about components used in a hospital setup. It is understood that the component repository 420 may include information about other components and that above are just few examples.

In one or more examples, the component roles repository 440 is a database system that stores information about one or more roles that the operator 405 may assign to each component in the environment. For example, the operator 405 may assign a role for a component in the industrial setup 300 via the composition system 410. In one or more examples, the operator 405 may create a new role for a component and add the new role to the component roles repository 440. Alternatively or in addition, the operator 405 may select from one or more roles that already exist in the component roles repository 440. In one or more examples, the composition system 410 accesses the component roles repository 440 and lists one or more component roles from the component roles repository 440 for the operator 405 to select via a user interface. In one or more examples, the operator 405 selects the one or more component roles for one or more respective placeholders of components in the environment.

For example, the operator 405 may assign the roles to the placeholders of the components using the environment map 415. The environment map 415 may include physical mapping information of the environment, such as the layout of the components in physical space. The mapping information may include information about the architecture of the building, facility, floor-space, or the like, for setting up the environment. The composition system 410 may display the floor-space for laying out the environment and include placeholders for the components to be placed in the layout. The environment map 415 may further include a component role assigned to each placeholder in the environment map 415. The environment map 415 further includes a flow of data (and/or goods) from one placeholder in the environment map 415 to another, according to the operation of the environment.

In one or more examples, the environment map 415 may include placeholders that the operator has previously associated with one or more component roles respectively. The composition system 410 facilitates the operator 405 to select a component for the placeholders that are associated with a role. Further, in one or more examples, the environment map 415 may include information of a component that is associated with a placeholder, consistent with the role assigned to the placeholder. The composition system 410 may facilitate the operator 405 to modify the layout by replacing a component associated with a placeholder in the environment map 415. For example, the operator may replace the component because of failure, or age, of the current component, or for any other reasons. The environment map 415 may further include blank placeholders, which the operator has not yet associated with a component. The composition system 410 may facilitate the operator 405 to add a new component to the environment at one or more blank placeholders in the environment map 415. The composition system 410 may further facilitate the operator 405 to create and add a new blank placeholder to the environment map 415, and further associate the new blank placeholder with a component role. The composition system 410, thus, facilitates the operator 405 to compose the environment with components according to the environment map, which includes placeholders and roles for the components of the environment.

The roles associated with the placeholders, and in turn with components of the environment, determine how the components interconnect for operation of the environment. For example, the industrial setup 300, may include roles such as a device monitor, (a component that reads operational information from another component), a device controller (a component that is controls a configuration of another component), a device manager (a component that collects diagnostics information, updates software/firmware version of another component), a data filter (a component that takes information from a component and produces a subset of that information), a data analyzer (a component that reads and processes information from another component), and the like.

In one or more examples, a role includes at least three parts (a) a name for the role (b) a list of other roles that provide input to a component in the current role; and (c) a set of other roles to which output is provided by a component in the current role. The roles may vary depending on the type of the environment. In one or more examples, the component roles repository 440 may be a central repository that is accessible by the composition system 410 and the vendor system 450. The vendor system 450 may associate a vendor restriction policy with a role from the component role repository 440. The vendor system 450 may store the vendor restriction policy in the vendor restrictions repository 430. In one or more examples, the vendor 455 may use the vendor system 450 to create and store the vendor restriction policy. In one or more examples, the vendor 455 may create a pair of a role in the component role repository 440 and a corresponding vendor restriction policy in the vendor restrictions repository 430. The vendor restrictions repository 430 is a database system that stores information about the vendor restrictions for each component listed in the component repository 420. In one or more examples, the vendor restriction repository 430 may be part of the component repository 420. Further yet, the vendor system 450 may facilitate the vendor 455 to identify, in the component repository, a component that the vendor 455 provides, the restriction policy associated with the component if the component is being used in a specific role.

For example, when a component is provided by the vendor 455, the vendor 455 provides a list of restriction policies associated with the component. In one or more examples, the restriction policy specify one or more of (i) which role the component can (or cannot) be assigned in the environment; (ii) a role that a component from another vendor may be assigned in the environment; and (iii) type of connections that the component in a specific role may use to interact with another component in another role. It is understood that the above limitations are examples and that the restriction policy may specify additional or alternative limitations than those above.

Thus, the technical solutions described herein facilitate the industrial operator, such as D, to specify roles, and the vendors, such as A, B, and C, to provide policies for using their components in specific roles. The technical solutions further facilitate identifying components from vendors that match roles specified by the operator, thus facilitating the operator to compose the environment, such as the industrial setup 300, in compliance with the vendor policies. For example, the composition system 410 identifies, for each role of a component, a graph of permissible links (input and output) to other components. The composition system 410 uses the graphs of the components to facilitate the operator 405 when composing the environment by putting different subgraphs together (discarding any combinations that violate policies) and generating a larger overall graph of the environment.

For example, consider a scenario where the operator 405 is composing the example environment 300. As earlier illustrated in FIG. 3, the operator D failed to use components from different components because of the impasse of communication of data between the components from different vendors. The operator 405 defines four roles in the environment 300, namely the roles of a device, a device monitor, a device filter, and a data analyzer. The operator 405 may define the roles as follows. Device takes no input, and provides output to a Device Monitor. Device monitor takes input from a Device, and provides output to a Device Filter. Device Filter takes input from a Device Monitor and provides output to a Data Analyzer. Data Analyzer takes input from a Device Filter or a Device Monitor. Further, the environment is subject to vendor policies. For example, Vendor A policies may specify that for any equipment in role of Device, only component from vendor A can be provided in role of Device Monitor; and if a Data Analyzer from competing vendors B is used, a component in Data Filter role from vendor A must be provided between the equipment in the role of a Device. Vendor B policies specify that for any equipment in role of Device, only component from vendor B can be provided in role of Device Monitor; and that if a Data Analyzer from competing vendors A or C is used, a component in Data Filter role from vendor B must be provided between the equipment in the role of a Device. Further, vendor C policies specify that their component from can only be in the role of a Data Analyzer.

Figure 6:
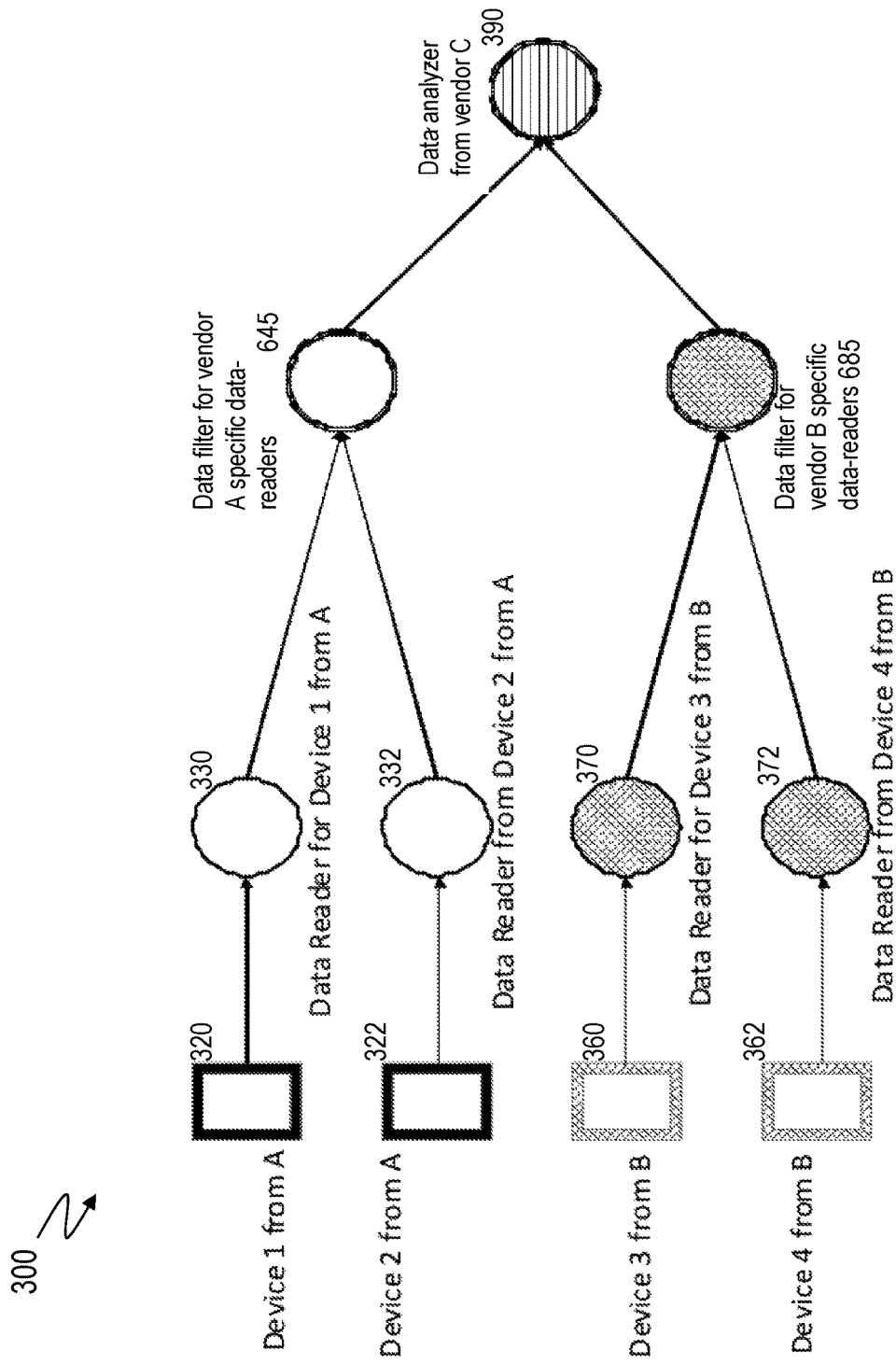
FIG. 6 illustrates an example composition of an environment in accordance with one or more embodiments.

The composition system 410 facilitates the operator D to compose the example environment using the components from the different vendors in a configuration that is consistent with the vendor policies and the specified roles. FIG. 6 illustrates an example composition of the environment. The composition illustrated is compliant with the policies of the vendors, with a data filter from vendor A 645 and a data filter from vendor B 685 used before data from vendor A and vendor B reaching the data analyzer 390 from vendor C. Thus, in contrast to the scenario in FIG. 3, the operator D uses components from different vendors to compose the environment 300. In one or more examples, a data filter, such as the data filter from vendor A 645, or the data filter from vendor B 685, limits the data that a data reader from the respective vendor is output to a component from another vendor.

Figure 7:
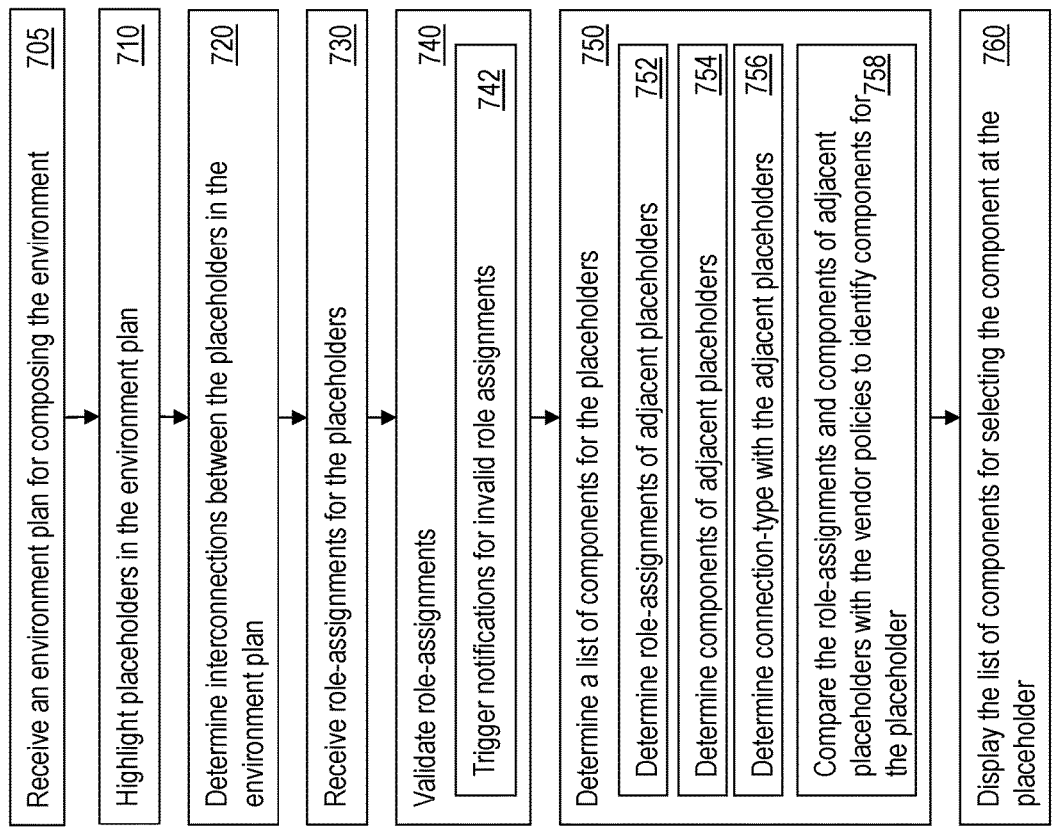
FIG. 7 illustrates a flowchart of example logic to compose an environment in accordance with one or more embodiments.

FIG. 7 illustrates a flowchart of an example method for selecting the components from multiple vendors for composing the environment, such as the industrial setup 300. The composition system 410 may receive the environment map 415 for composing the environment, as shown at block 705. In one or more examples, the operator 405 inputs the environment map 415 via a user interface of the composition system 410. For example, the environment map 415 may be a computer readable file. In one or more examples, the environment map 415 depicts the physical layout of a floor space where the components are to be placed in the environment. For example, the environment map 415 may be blueprint of a floor space of an assembly line, a factory, a hospital, a shipping company, and the like. Alternatively or in addition, the environment map 415 depicts a virtual layout of the placeholders for the components of the environment. For example, the virtual layout may be a graphical representation of flow of data, or goods, among the components. For example, the virtual layout may be a graph that depicts the flow of data or goods, rather than a physical layout of the components in the environment. The environment map 415 may include placeholders for the components. Alternatively or in addition, the operator 405 identifies the placeholders in the environment map 415 via the user interface.

The user interface of the composition system 410 highlights the placeholders in the environment map 415, as shown in block 710. In one or more examples, the user interface highlights the placeholders for which components are to be selected. Alternatively or in addition, the user interface highlights all the placeholders in the environment map 415.

The composition system 410 determines the interfaces between the placeholders in the environment map 415, as shown at block 720. In one or more examples, the composition system 410 determines the interfaces based on the connections listed in the environment map 415. For example, the environment map 415 may include a table that includes at least one entry for each placeholder in the environment map 415. The entry lists a pair of placeholders that includes a source placeholder, and a destination placeholder. Alternatively or in addition, the composition system 410 parses the environment map 415 to identify the interconnections between the placeholders.

The composition system 410 receives a role assignment for each placeholder via the user interface, as shown at block 730. For example, the composition system 410 receives the role assignments from the operator 405. In one or more examples, the operator 405 specifies the roles for a subset of the placeholders, for example the highlighted placeholders. In one or more examples, the operator creates a new role for a placeholder. Alternatively or in addition, the operator 405 selects a role for the placeholder from a predetermined list of roles that the operator 405 has created previously. In one or more examples, the composition system 410 displays a list of the predetermined list of roles for the operator 405 to select from. For example, the composition system 410 accesses the roles from the component roles repository 440.

The composition system 410 further validates that the role assigned to a placeholder is compliant with vendor policies from the vendor restrictions repository 430, as shown at block 740. The composition system 410 validates the role assignment of a first placeholder based on the role assignment of a second placeholder that is adjacent to the first placeholder. For example, referring to the above example scenario, consider that the second placeholder has been assigned a Device Analyzer role, which takes an input only from a Data Filter or a Data Monitor. In this case, if the first placeholder feeds into the second placeholder, the first placeholder may not be assigned a Device role. Accordingly, in one or more examples, the composition system 410 may not list the Device role in the list of roles to select from, thus, preventing the operator 405 from selecting an invalid role. Alternatively or in addition, if the operator 405 assigns the Device role to the first placeholder, the composition system may indicate, such as via an audio and/or visual notification, that the role assignment is invalid, as shown at block 742. The notification may include highlighting the placeholder using a different color, border, or in any other manner.

The composition system 410 further determines a list of components that are compliant with the placeholder, based on the role assigned to the placeholder and the vendor policies from the vendor restrictions repository 430, as shown at block 750. The list of components may include components from any vendor. For example, the composition system 410 generates the list by comparing the vendor policies with a combination of the role assigned to the placeholder, the role assigned to the placeholders that are immediately adjacent to the placeholder, and components in the immediately adjacent placeholders, as shown at blocks 752, 754, and 758. Alternatively or in addition, the composition system 410 determines the type of connection used to interact with the adjacent placeholders, as shown at block 756. For example, the type of connection may determine whether a wired or a wireless communication is used. The type of connection may further specify a type of communication protocol being used, such as Ethernet, BLUETOOTH™ (BLE™), ZIGBEE™, or any other communication protocol. The composition system 410 may identify a component that is compliant with the placeholder based on the type of connection between the roles of the placeholder and the adjacent placeholder according to the vendor policies for the roles, as shown at block 758.

In one or more examples, the composition system 410 displays the list of components for selecting the component to be used at the placeholder via the user interface, as shown at block 760. The operator 405 selects a component from the list and thus, composes the environment. The composition system 410 continues the above method to facilitate the operator 405 to select components for all the placeholders in the environment map 415.

Thus, the technical solutions described herein facilitate an operator to compose an environment, such as an industrial setup, using components from multiple vendors. The technical solutions facilitate the environment to be compliant with vendor policies that restrict inter-communication between components from different vendors. The technical solutions described herein facilitate the composition based on role assignments for placeholders of components in an environment map. The vendors, in one or more examples, may provide policies specific to the one or more roles that the operator may assign to components (or placeholders) in the environment. The technical solutions, based on the roles and the vendor policies identify the components that may be used in the environment. The operator, accordingly, composes the environment using components from multiple vendors such that a component from one vendor is not restricted from communicating with a component from another vendor.

The technical solutions improve typical techniques of composing environments, in which roles are assigned to interfaces, in order to determine whether a component is able to call an interface based on the properties of the calling interface. Because the technical solutions described herein assign roles to components, and not to interfaces, the technical solutions described herein determine compatibility of the components based on the roles assigned to and the properties of the components itself. Alternatively, typical approaches use a mediator, which may be a service that takes data from one component and passes it to another component by converting the data from one format to another. Using a mediator that converts data from one vendor into a format for a second vendor may not be compliant with the vendor policies, and further may result in using additional computational resources for the conversion itself. The technical solutions described herein facilitate the operator to compose the environment as a graph (that is relatively static in industrial setups) and uses role based techniques to determine a component in an environment based on the roles of other components that the component communicates with.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer-implemented method for selecting components from multiple vendors for a system, the computer-implemented method comprising:
   receiving, by a processor, an environment map that identifies a first component placeholder of the system;
   identifying, by the processor, that the first component placeholder interfaces with a second component placeholder the system;
   determining, by the processor, a role assigned to the first component placeholder, wherein the role indicates a type of data that a first component at the first component placeholder communicates with a second component at the second component placeholder;
   determining, by the processor, a list of components for selecting the first component, wherein each component from the list of components matches the role assigned to the first component placeholder; and determining, by the processor, the list of components based on a vendor policy associated with each component from the list of components,
   wherein the vendor policy constrains the corresponding component from being used in the role of the first component placeholder,
   wherein the role assigned to the first component placeholder further indicates a list of other roles that input data to the first component at the first component placeholder,
   identify, by the processor, a role assigned to the second component placeholder;
   identify, by the processor, a vendor of the second component at the second component placeholder; and
   determine, by the processor, the list of components for selecting the first component based on both, the vendor policy of the second component, and the role of the second component placeholder; and
   displaying, by the processor, the list of components.

2. The computer-implemented method of claim 1, wherein the vendor policy constrains the corresponding component from outputting the type of data.

3. The computer-implemented method of claim 1, wherein the vendor policy constrains the corresponding component from outputting the type of data to the second component.

4. The computer-implemented method of claim 1, wherein the vendor policy constrains the corresponding component from outputting the type of data to the second component in response to the second component being from a specific vendor.

5. The computer-implemented method of claim 1, wherein the role assigned to the first component placeholder is determined by receiving the role via a user interface.

6. The computer-implemented method of claim 1, wherein the role assigned to the first component placeholder is from a predetermined set of roles consisting of a device monitor, a device controller, a device manager, a data filter, and a data analyzer.

7. The computer-implemented method of claim 1, wherein the role assigned to the first component placeholder further indicates a list of other roles that receive data from the first component at the first component placeholder.

8. An apparatus for selecting components from multiple vendors for a system, the apparatus comprising:
   a memory; and
   a processor coupled with the memory, the processor being configured to:
      receive an environment map that identifies a first component placeholder of the system;
      identify that the first component placeholder interfaces with a second component placeholder of the system;
      determine a role assigned to the first component placeholder, wherein the role indicates a type of data that a first component at the first component placeholder communicates with a second component at the second component placeholder;
      determine a list of components for selecting the first component, wherein each component from the list of components matches the role assigned to the first component placeholder;
      determine the list of components based on a vendor policy associated with each component from the list of components,
      wherein the vendor policy constrains the corresponding component from being used in the role of the first component placeholder,
      wherein the role assigned to the first component placeholder further indicates a list of other roles that input data to the first component at the first component placeholder,
      identify a role assigned to the second component placeholder;
      determine the list of components for selecting the first component based on the role of the second component placeholder;
      identify a vendor of the second component at the second component placeholder; and
      determine the list of components for selecting the first component based on the vendor policy of the second component and the role of the second component placeholder; and
      display the list of components.

9. The apparatus of claim 8, wherein the vendor policy constrains the corresponding component from outputting the type of data to the second component.

10. The apparatus of claim 8, wherein the vendor policy constrains the corresponding component from being used in the role of the first component placeholder.

11. A computer program product for selecting components from multiple vendors for a system, the computer program product comprising a non-transitory computer readable storage medium, the computer readable storage medium comprising computer executable instructions, wherein the computer readable storage medium comprises instructions to:
   receive an environment map that identifies a first component placeholder of the system;
   identify that the first component placeholder interfaces with a second component placeholder the system;
   determine a role assigned to the first component placeholder, wherein the roe indicates a type of data that a first component at the first component placeholder communicates with a second component at the second component placeholder;

determine a list of components for selecting the first component, wherein each component from the list of components matches the role assigned to the first component placeholder; and determine the list of components based on a vendor policy associated with each component from the list of components, wherein the vendor policy constrains the corresponding component from being used in the role of the first component placeholder, wherein the role assigned to the first component placeholder further indicates a list of other roles that input data to the first component at the first component placeholder, identify a role assigned to the second component placeholder;

identify a vendor of the second component at the second component placeholder; and determine the list of components for selecting the first component based on both, the vendor policy of the second component, and the role of the second component placeholder; and display the list of components.

12. The computer program product of claim 11, wherein the computer readable storage medium further comprises instructions to determine the list of components based on a role assigned to the second component placeholder.

* * * * *